United States Patent [19]

Polkinghorn

[11] 3,728,696

[45] Apr. 17, 1973

[54] HIGH DENSITY READ-ONLY MEMORY

[75] Inventor: Robert W. Polkinghorn, Huntington Beach, Calif.

[73] Assignee: North American Rockwell Corporation, El Segundo, Calif.

[22] Filed: Dec. 23, 1971

[21] Appl. No.: 211,311

[52] U.S. Cl. ..............................340/173 SP, 307/279

[51] Int. Cl...........................G11c 17/00, G11c 11/40

[58] Field of Search....................340/174 SP, 173 SP; 307/238, 279

[56] References Cited

UNITED STATES PATENTS

| | | | |
|---|---|---|---|
| 3,611,437 | 10/1971 | Varadi | 340/173 SP |
| 3,613,055 | 10/1971 | Varadi | 340/173 SP |
| 3,665,473 | 5/1972 | Heimbigner | 340/173 R |

*Primary Examiner*—Stanley M. Urynowicz, Jr.
*Attorney*—L. Lee Humphries et al.

[57] ABSTRACT

A read-only memory (ROM) has a plurality of address input lines and selection lines forming a matrix with regions of a semiconductor substrate. Binary information is stored at locations between adjacent semiconductor regions by the presence or absence of field effect transistors thereat. Alternate semiconductor regions are selectively connected to a voltage reference, and the remaining regions there-between are selectively connected to a common output point by means of selection field effect transistors in series with each region. Selection signals applied to the selection transistors of an adjacent pair of regions connect one region to the voltage reference and the other region to output to provide an output signal as a function of data stored at a particular addressed storage location.

6 Claims, 3 Drawing Figures

INVENTOR
ROBERT W. POLKINGHORN

BY Robert G. Rogers
ATTORNEY

PATENTED APR 17 1973 3,728,696

SHEET 2 OF 3

INVENTOR
ROBERT W. POLKINGHORN

BY Robert D. Rogers
ATTORNEY

INVENTOR
ROBERT W. POLKINGHORN

BY Robert G. Rogers
ATTORNEY

HIGH DENSITY READ-ONLY MEMORY

BACKGROUND OF THE INVENTION

1. Field of the Invention

The invention relates to a high density read-only memory.

2. Description of Prior Art

The prior art is believed represented by the read-only memory illustrated in FIG. 1 wherein conductive semiconductor regions within a substrate are represented by vertical lines, and field effect transistors (FET's) are represented by circles. Address lines $A_1$ through $A_8$ and select lines $S_1$ through $S_8$. The address conductors form a matrix with adjacent semiconductor regions. Data is stored at a particular address by field effect transistors, e.g. FET 3, provided between a first semiconductor region 4 connected to a reference voltage level, e.g. electrical ground, and an adjacent semiconductor region 2 connected through a selection field effect transistor, e.g. FET 5, to a common output 10 for each of the semiconductor regions of a particular bit position. The FET's 1 and 5 are in series in the vertical semiconductor regions and the horizontal lines through these FET's are connections to the respective gate electrodes of the FET's. Each FET 3 is connected between the two flanking semiconductor regions, and the horizontal lines ($A_1$ to $A_8$) therefore represent both these connections and the connections to the gate electrodes.

For the usual operation, only one of the address signals and one of the selection signals are true during a particular memory cycle. Prior to addressing the memory, the precharge field effect transistors 1 are turned on by a signal on the precharge line to contact each of the semiconductor regions 2 to –V. The regions are charged to approximately the –V voltage level. Subsequently, the precharge field effect transistors are turned off and the semiconductor regions are addressed by signals appearing on the address lines $A_1$ through $A_8$. Signals on the selection conductors $S_1$ through $S_8$ enable the connection of a particular semiconductor region to the output 10. In other words, the semiconductor region must be addressed and selected concurrently if an output is to occur.

If $A_1$ and $S_1$ are true, the semiconductor region 2 is connected through field effect transistor 3 to the electrical ground provided on semiconductor region 4. As a result, since field effect transistor 5 is on, the output is connected to electrical ground. Therefore, even if a field effect transistor, e.g. 3', is provided for another semiconductor region 2' corresponding to an $A_1$ address without a signal on the select line 53 corresponding to the other semiconductor region, no output can occur thereat. Since the memory of FIG. 1 has eight address rows and eight select columns, 64 bits ($8 \times 8 = 64$) of data can be stored in the memory.

Although the memory illustrated in FIG. 1 provides a favorable memory structure, it is limited in that a substantial amount of semiconductor substrate area is required for storing a large number of multi-bit words. In this regard, a pair of select columns employ three semiconductor regions (e.g. 2, 4 and 6); so that, an eight column memory requires 12 such regions, as shown. Large numbers of multi-bit words are frequently used for example to store instructions of a micro-program. Therefore, suitable means must be provided for implementing a read-only memory having a reduced substrate area. The present invention provides such a memory.

SUMMARY OF THE INVENTION

Briefly the invention comprises a read-only memory having a matrix of semiconductor regions, address lines and selection lines. Field effect transistors are connected in various locations between adjacent semiconductor regions for storing data at a particular address for each bit position. The field effect transistors isolate charge on the semiconductor regions to implement the storage function depending on whether or not a field effect transistor device is present at the addressed location. The charge or absence of charge represents the logical state of stored binary data e.g. true or false. Field effect transistors are formed in each semiconductor region for enabling the read-out of data stored at a selected address. The isolated charge (or absence of charge) is permitted to electrically influence the output. In the usual application, a device (FET) responds to the charge (or absence) to provide an appropriate output voltage level representing the stored data. Significantly, alternate ones of the semiconductor regions are connected to a reference voltage level whereas regions between the alternate semiconductor regions are connected together at a common output point.

During a memory cycle, adjacent semiconductor regions are selected. Depending on the semiconductor region being addressed, one region is connected through a selection field effect transistor controlled by a signal on a selection line to a reference voltage level and the adjacent semiconductor region is connected through a field effect transistor controlled by the signal on the adjacent selection line for enabling a read-out of a signal representing the data stored on the adjacent semiconductor region.

Selection signals are provided for the selection lines. The selection signals remain on during the address period so that selection field effect transistors in adjacent semiconductor regions are on simultaneously for selecting the address corresponding to a particular semiconductor region.

Therefore, it is an object of this invention to provide a read-only memory requiring an average of approximately one semiconductor region for implementing addressable memory locations for a particular bit position of a binary word.

It is another object of this invention to provide a read-only memory in which one semiconductor region is connected to a reference voltage level and an adjacent semiconductor region is connected to an output for enabling a read-out of information stored at the selected address location.

A further object of this invention is to provide a read-only memory for a plurality of multibit computer words requiring a substantially reduced amount of semiconductor substrate area.

Another object of this invention is to provide an improved high density read-only memory.

A still further object of this invention is to provide a high density read-only memory in which adjacent semiconductor regions are time-shared for enabling the connection of a selected address to an output and to a reference voltage level simultaneously.

Another object of this invention is to provide an improved selection system for a read-only memory in which adjacent semiconductor regions of the read-only memory are simultaneously connected to a reference voltage source and an output.

Another object of this invention is to provide a high density read-only memory which can be used in calculators, timing and control systems, and electronic musical systems.

It is another object of this invention to provide an improved high density read-only memory capable of storing a large number of multibit words comprising instructions for a micro-program.

A still further object of this invention is to provide a relatively compact read-only memory in which select conductors enable adjacent semiconductor regions to be time-shared for reducing the substrate area required for the read-only memory.

These and other objects of this invention will become more apparent when taken in connection with the description of the drawings, a brief description of which follows:

DESCRIPTION OF PREFERRED EMBODIMENT

Figure 2:
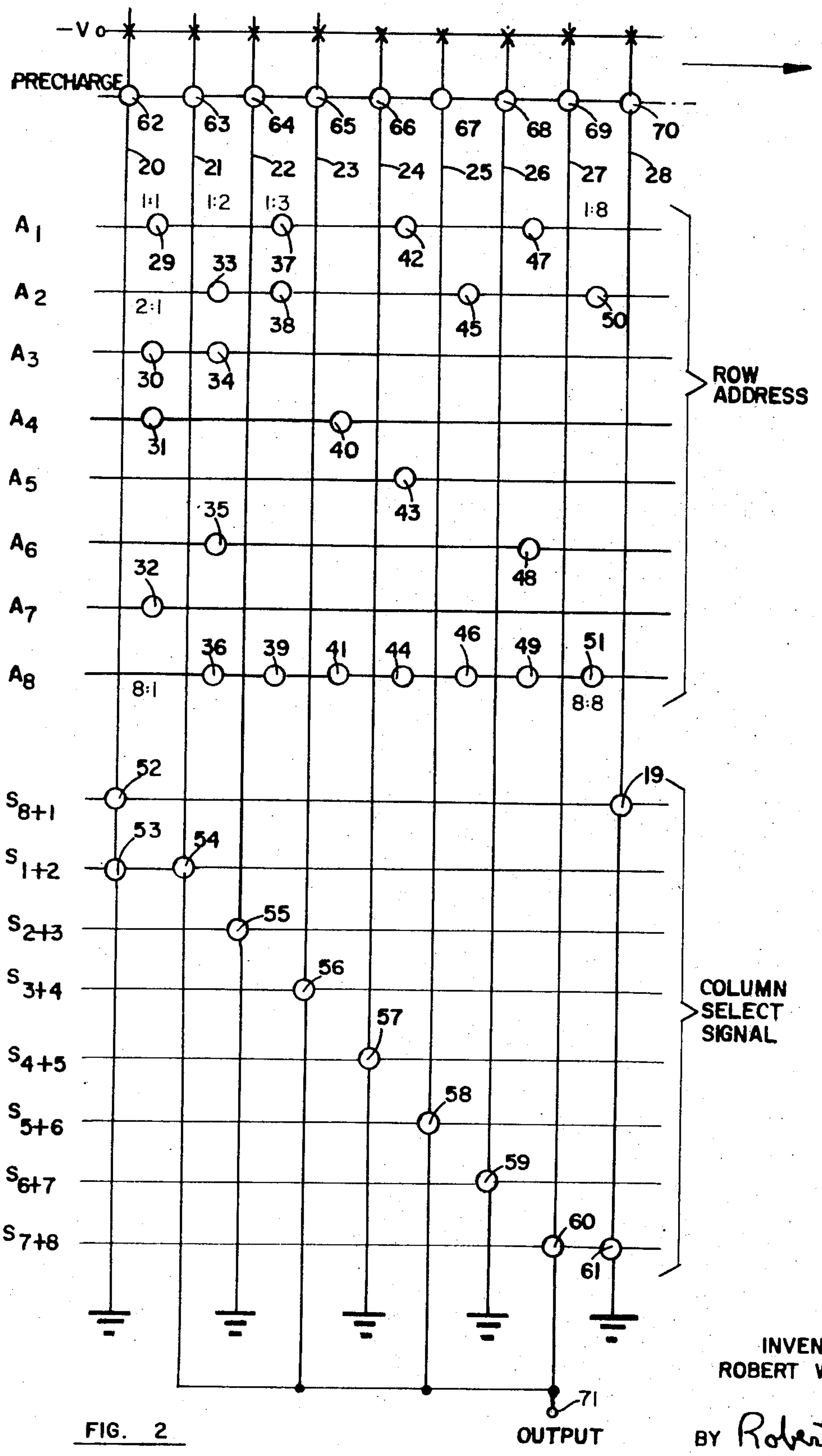
FIG. 2 is a schematic illustration of a high density read-only memory embodying the invention.

FIG. 2 represents bit portions of a multibit word having eight possible row addresses, $A_1 - A_8$ and eight possible column addresses, $S_{8+1} - S_{7+8}$. As a result, 64 possible storage locations (addresses) are provided. In order to address a location, a column select line and a row address line must have a true signal thereon. In the usual case, only one row address signal and column select signal are true during a memory cycle. The row and column lines are equivalent to the X and Y-lines of a memory matrix. The bit locations may be designated 1:1 to 1:8, and some of these addresses are shown in the figure.

The memory comprises diffused P-regions 20–18 electrically connected between a first voltage potential e.g. −V, and either the output 71 or a reference potential e.g. electrical ground. In accordance with the present invention, alternate ones of the P-regions (e.g. regions 21, 23, 25, and 27) are connected to the output and the remaining P-regions (20, 22, 24, 26, and 28) are connected to the ground potential.

It should be understood that the memory may also be implemented by diffused N-channels which might necessitate using positive voltage levels. In that case, the logic convention described in connection with the preferred embodiment may also be changed. Since P-regions are selected for the preferred embodiment, negative voltage levels are utilized to actuate the field effect transistors comprising the memory and to represent a true logic state. The electrical ground voltage level represents a false logic state.

The memory further comprises field effect transistors 29 through 51 formed between adjacent P-regions for implementing the read-only memory. The presence or absence of a field effect transistor between the P-regions indicates the logic state of the information stored at that particular address location. Thus, where a transistor is absent (e.g. at 1:2 and 8:1) the stored bit is "1," and where a transistor is present (e.g. at 1:1 and 1:3) the stored bit is "0." The presence of a field effect transistor results in a false output, and the absence thereof results in a true output, when the address line and the two select lines corresponding to the field effect transistor are true.

Column select field effect transistors 52 through 61 are formed in series in the P-regions 20 through 28, as opposed to the address field effect transistors which are formed between the P-regions. The column select field effect transistors enable the P-region to be connected to electrical ground or to the output. It is pointed out that column select signals for two adjacent P-regions are true for the memory address interval. As a result, at least two of the column select field effect transistors are on during each address cycle. For example, if any of the locations 1:1 to 8:1 is selected, the $S_{8+1}$ and $S_{1+2}$ signals are true and field effect transistors, 52, 53, and 54 are on during the corresponding memory address cycle.

The P-regions are initially precharged to approximately the −V voltage level through field effect transistors 62 through 70. The precharge interval occurs before a memory address cycle. The charge is stored on the inherent capacitance associated with the P-regions.

Figure 1:
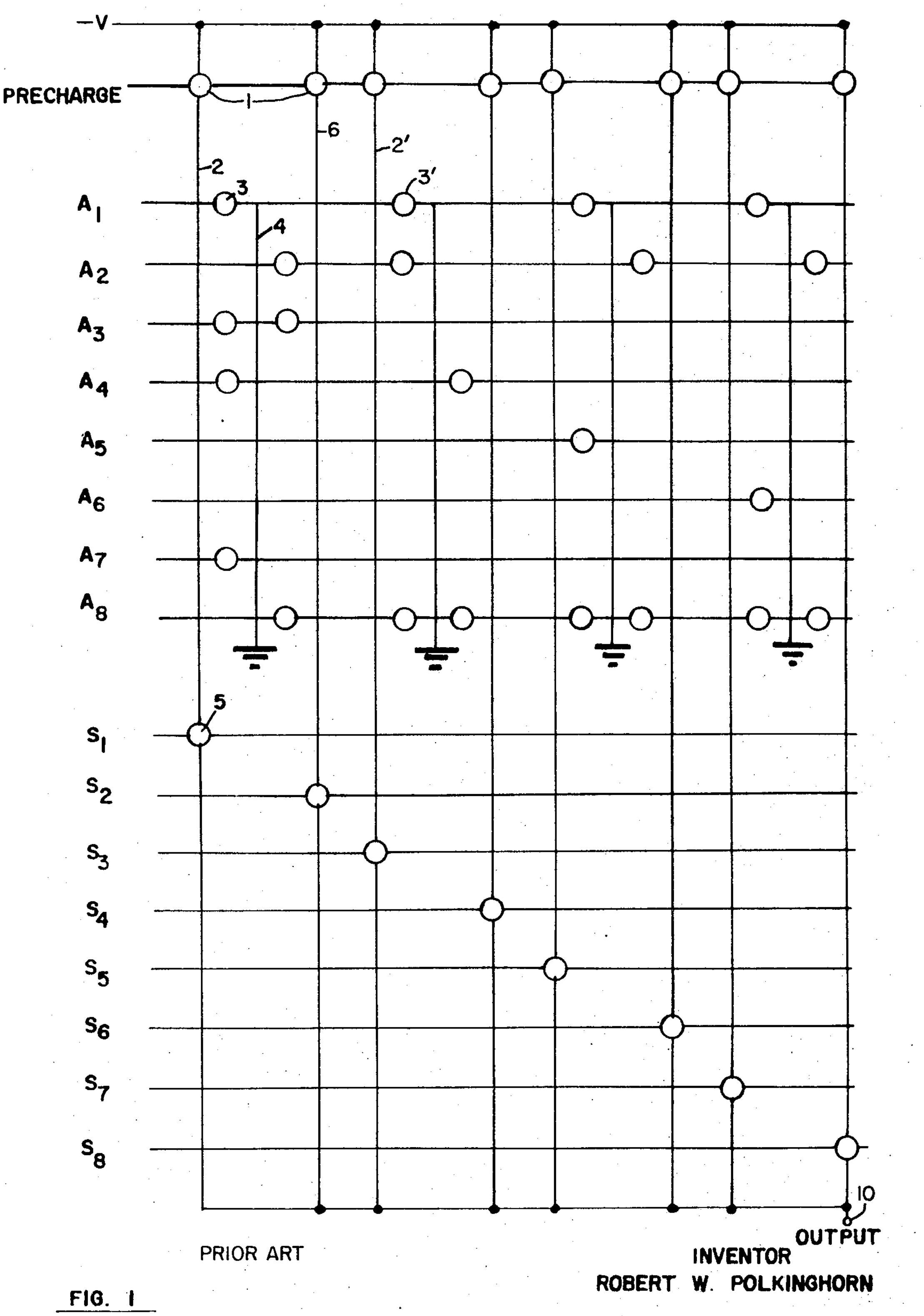
FIG. 1 is a schematic illustration of an existing read-only memory.

The high density of the memory can be seen by comparing the memory with the prior memory of FIG. 1. In FIG. 1, three diffused regions 2, 4, and 6 were required for each two NOR gates of the bit position. The number of diffused regions is 3/2 N, where N is the number of select columns. On the other hand, in the FIG. 2 embodiment, only two P-regions, e.g. 20 and 21 are required to implement two NOR gates. The number of diffused regions is N+1, where N is the number of select columns. It should be understood that although NOR gates are used to implement this memory embodiment, other types of logic gates can also be utilized. In NOR gate embodiments, if a device is present, e.g. true, the output is false, If a device is not present, e.g. false, the output is true. The terms true and false are used to represent logic 1 and logic 0 binary states, respectively.

Since one additional P-region is required to implement each pair of NOR gates in the prior embodiment, approximately one-third more substrate area is required to produce a read-only memory.

Figure 3:
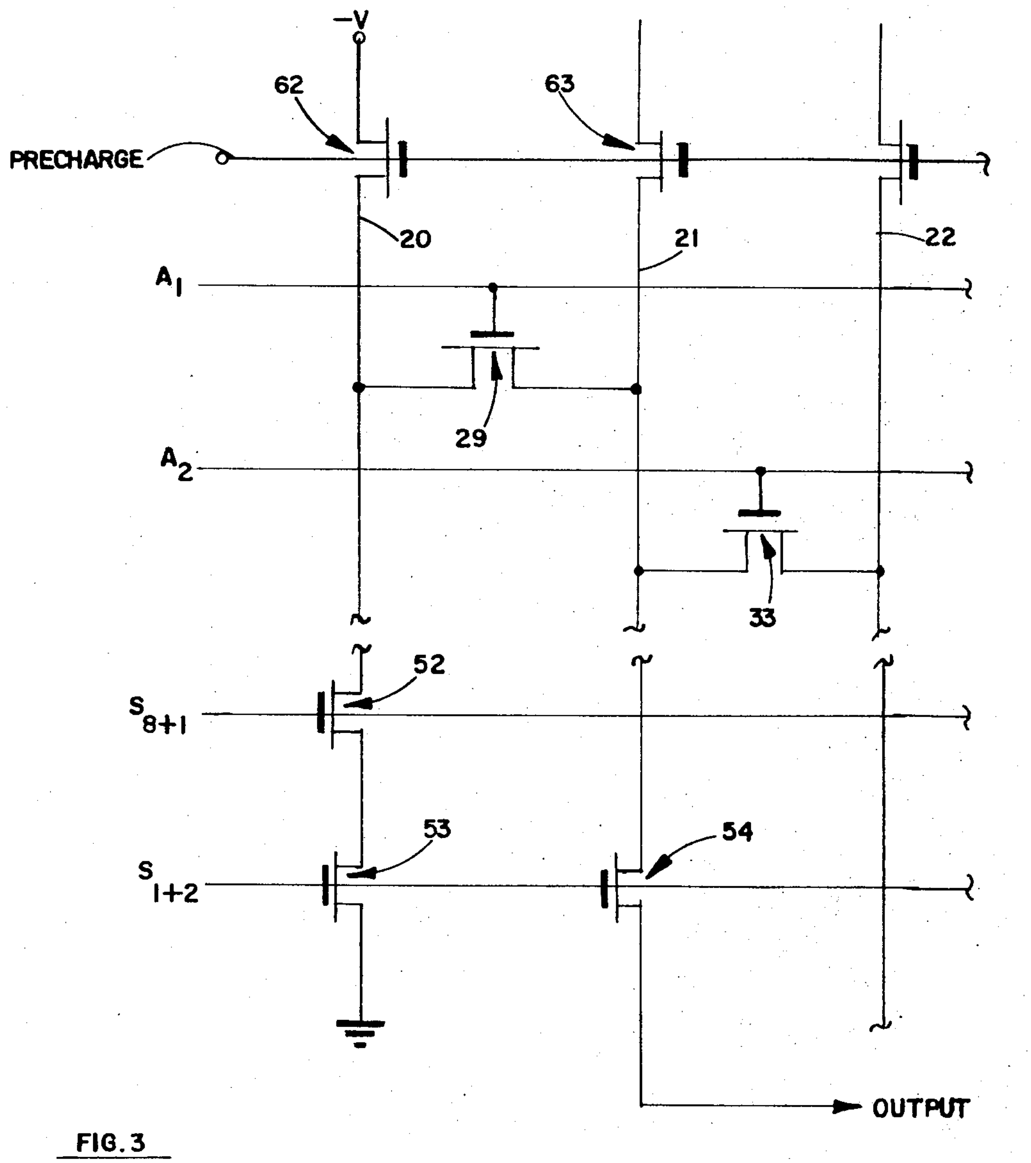
FIG. 3 is a schematic illustration showing portions of the FIG. 2 memory in more detail.

A portion of the FIG. 2 embodiment has been illustrated in schematic form in FIG. 3. As shown in FIG. 3, field effect transistor 29 extends between P-regions 20 and 21. A true (negative) signal on the address line $A_1$ actuates field effect transistor 29 to electrically connect P-regions 20 and 21. Regions 21 and 22 remain isolated. On the other hand, if the $A_2$ signal is true, there is no electrical connection between P-regions 20 and 21. In that case, the electrical connection would be provided between P-regions 21 and 22. The precharge field effect transistors 62 and 63 are connected in electrical series with the P-regions 20 and 21, respectively, for applying −V to each P-region prior to a memory address cycle. P-regions are thus precharged to the −V voltage level when a true precharge signal is supplied. Subsequently, the precharge field effect transistors are turned off and the $-V$ voltage level is stored on the capacitance of the P-regions.

The schematic diagram has also been extended to include a portion of the column select region of the memory. The column select field effect transistors 52 and 53 for the column lines $S_{8+1}$ and $S_{1+2}$ are shown in electrical series with P-region 20. If the column select signals are true, the P-region is connected to electrical ground. Field effect transistor 54 is connected in electrical series with P-region 21 to provide an output for the corresponding NOR gates, e.g. NOR gate associated with P-region 20 and NOR gate associated with P-region 21, when the NOR gates are addressed.

FIG. 2 is utilized to describe an operating cycle of the memory. In operation, the precharge field effect transistors 62–70 are turned on and each of the P-regions 20–28 is precharged to approximately the $-V$ voltage level. During the precharge interval, the column select field effect transistors 52–61 are held off. Similarly, the row address field effect transistors 29 through 51 are also held off during the precharge interval.

Following the precharge interval, a particular storage location is addressed by providing a true signal on one of the row address lines $A_1$ through $A_8$ and a true signal on two of the column select lines $S_{8+1}$ through $S_{7+8}$. For purposes of this description, it is assumed that the signal on the $A_1$ address line and the signals on the $S_{8+1}$ and $S_{1+2}$ address lines are true during the memory cycle. The other signals are therefore false. During the memory cycle, field effect transistors 52 and 53 are turned on such that P-region 20 is connected to electrical ground. Since field effect transistor 29 between P-regions 20 and 21 is also on, the two P-regions are electrically connected and P-region 21 is also discharged to electrical ground through the electrical path provided by the field effect transistor 29. Field effect transistor 54 is also on, whereby the output is false. In other words, since field effect transistor 29 is present and activated to effect an electrical connection between P-regions 20 and 21, these regions are discharged to electrical ground and the output is false.

On the other hand, if field effect transistor 29 had been omitted, i.e. had not been present, the charge on P-region 21 would not have been discharged through the field effect transistors 52 and 53 to electrical ground. In that case, the corresponding NOR gate would have been false and the output would have been true.

It should be understood that the row and column lines may ex-tend to other bit locations in addition sections of the memory (not shown). The output from all bits of the addressed memory are received simultaneously on the respective output terminals 71.

Field effect transistors 52 and 53 and 19 and 61 form two AND gate arrangements which are required to prevent simultaneous selection of P-regions 20 and 28. For example, if the location 8:1 is selected, lines $A_8$, $S_{8+1}$, and $S_{1+2}$ are made true. Since $A_8$ is true, FET's 36, 39, 41, 44, 46, 49, and 51 are conductive and, if only FET 19 were present in region 28, the output 71 could be grounded erroneously through FET's 19, 51, 49, 46, 44, 41, 39, 36, and 54. This path is blocked by FET 61 whereby region 28 is only grounded when both $S_{8+1}$ *and* $S_{7-8}$ are true. Similarly, region 20 is only grounded via FET's 52 and 53 when both $S_{8+1}$ and $S_{1+2}$ are true.

I claim:

1. A high density read-only memory comprising, a plurality of conducting regions in a semiconductor substrate, a plurality of address lines and a plurality of select lines forming a matrix with said conducting regions, said matrix being associated with bit positions of the memory, alternate ones of said conducting regions being connected to a reference potential and the remaining conducting regions being connected to a common output for said bit positions, a first group of field effect transistors actuated by signals on said address lines, said first group of field effect transistors being selectively connected between adjacent conducting regions for storing data at associated bit positions of the read-only memory, and a second group of field effect transistors actuated by signals on said select lines for selecting conducting regions to be connected to said output and to said reference potential.

2. The read-only memory recited in claim 1 wherein said second group of field effect transistors are connected in electrical series with said plurality of conducting regions, and means enabling said second group of field effect transistors to remain actuated for a memory address cycle with signals on adjacent ones of said select lines being on during the memory cycle for actuating field effect transistors in adjacent semiconductor regions during the memory cycle whereby one conducting region is connected to said reference potential while the adjacent conducting region is connected to said common output.

3. The read-only memory recited in claim 2 further including a third group of field effect transistors connected in electrical series with each of said plurality of conducting regions for precharging said conducting regions to a first voltage level prior to said memory address cycle, and signals on said address lines and said select lines actuating selected ones of said first and second groups of field effect transistors for enabling the charge on the conducting regions corresponding to the signals on said select lines to be provided to the output or to be discharged to said reference potential as a function of the presence or absence of a field effect transistor of said first group of field effect transistors between the adjacent semiconductor regions selected.

4. The read-only memory recited in claim 3 further including a plurality of said matrixes, said first, said second, and said third groups of field effect transistors for implementing a read-only memory having a plurality of multi-bit memory sections.

5. The read-only memory recited in claim 3 further including a field effect transistor connected in electrical series with certain ones of said second group of field effect transistors in said conducting regions for preventing discharge of non-selected conducting regions to said reference potential during a memory address cycle.

6. The read-only memory recited in claim 1 wherein the presence of a field effect transistor from said first group of field effect transistors between adjacent conducting regions indicates the storage of one state of data and the absence of a field effect transistor at said location indicates the storage of a different logic state of data, the presence of a field effect transistor between adjacent semiconductor regions enabling both regions to be connected to said referenced potential if the field effect transistor at said address location is actuated by a signal on said address line and if the adjacent conducting regions are selected by signals on said select lines.

* * * * *

PO-1050
(5/69)

UNITED STATES PATENT OFFICE
CERTIFICATE OF CORRECTION

Patent No. 3,728,696 Dated April 17, 1973

Inventor(s) Robert W. Polkinghorn

It is certified that error appears in the above-identified patent and that said Letters Patent are hereby corrected as shown below:

Column 1, lines 13 and 14, delete ". The address conductors", line 35, change "contact" to --connect--.

Column 3, line 47, change "18" to --28--.

Signed and sealed this 1st day of January 1974.

(SEAL)
Attest:

EDWARD M.FLETCHER,JR.
Attesting Officer

RENE D. TEGTMEYER
Acting Commissioner of Patents